United States Patent
Manabe et al.

(10) Patent No.: US 7,446,949 B2
(45) Date of Patent: Nov. 4, 2008

(54) DRIVING MECHANISM, IMAGING MECHANISM AND CELLULAR PHONE

(75) Inventors: Mitsuo Manabe, Saitama (JP); Takeshi Ichimiya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 204 days.

(21) Appl. No.: 11/387,987

(22) Filed: Mar. 24, 2006

(65) Prior Publication Data

US 2006/0221472 A1    Oct. 5, 2006

(30) Foreign Application Priority Data

Mar. 31, 2005  (JP) ............ P.2005-103064
Feb. 16, 2006  (JP) ............ P.2006-039794

(51) Int. Cl.
G02B 15/14   (2006.01)
G03B 13/10   (2006.01)
G11B 7/00    (2006.01)

(52) U.S. Cl. ............ 359/696; 396/378; 369/44.15

(58) Field of Classification Search ............ 359/694, 359/696, 823–824; 369/44.15; 310/320, 310/323.01, 328, 367–368; 396/378–379, 396/529

See application file for complete search history.

(56) References Cited

U.S. PATENT DOCUMENTS 5,225,941 A     7/1993   Saito et al.
5,490,015 A *   2/1996   Umeyama et al. ............ 359/824
5,675,444 A *   10/1997  Ueyama et al. ............. 359/824
6,111,336 A *   8/2000   Yoshida et al. ............. 310/328
2002/0030422 A1* 3/2002  Hata ..................... 310/323.17
2005/0242688 A1* 11/2005 Yuasa et al. ................. 310/328

FOREIGN PATENT DOCUMENTS

JP          2633066 B2    4/1997

\* cited by examiner

*Primary Examiner*—Ricky Mack
*Assistant Examiner*—Dawayne A Pinkney
(74) *Attorney, Agent, or Firm*—Birch, Stewart, Stewart, Kolasch, LLP

(57) ABSTRACT

A driving mechanism comprises: (i) an electromechanical conversion element comprising: an elongating and contracting portion that elongates and contracts; and a dummy layer that does not contribute to elongation and contraction of the electromechanical conversion element, in which one end of the dummy layer is attached to one end, in elongating and contracting direction, of the elongating and contracting portion; (ii) a driving friction member directly or indirectly attached to the other end of the elongating and contracting portion of the electromechanical conversion element; and (iii) a driven member frictionally engaged with the driving friction member, wherein a center of gravity of the entire electromechanical conversion element is not made coincident with a geometric center of the elongating and contracting portion in the elongating and contracting direction.

24 Claims, 11 Drawing Sheets

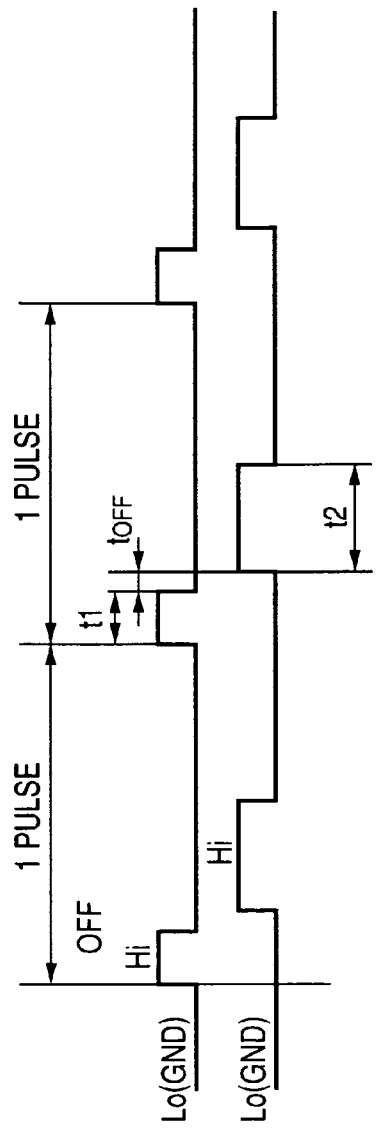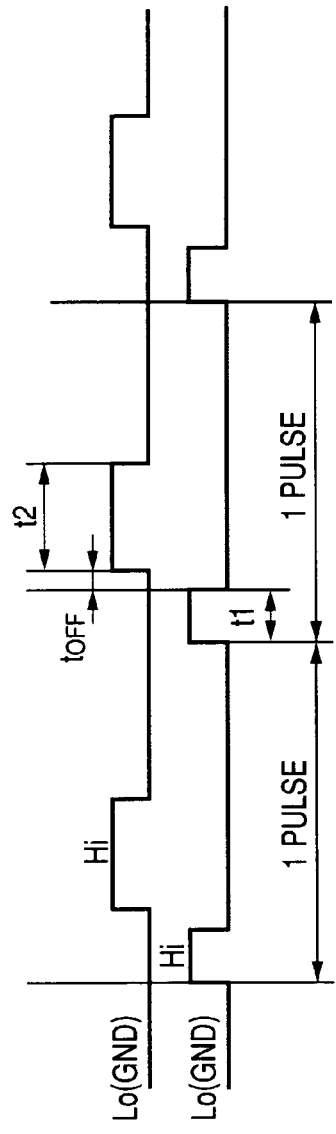

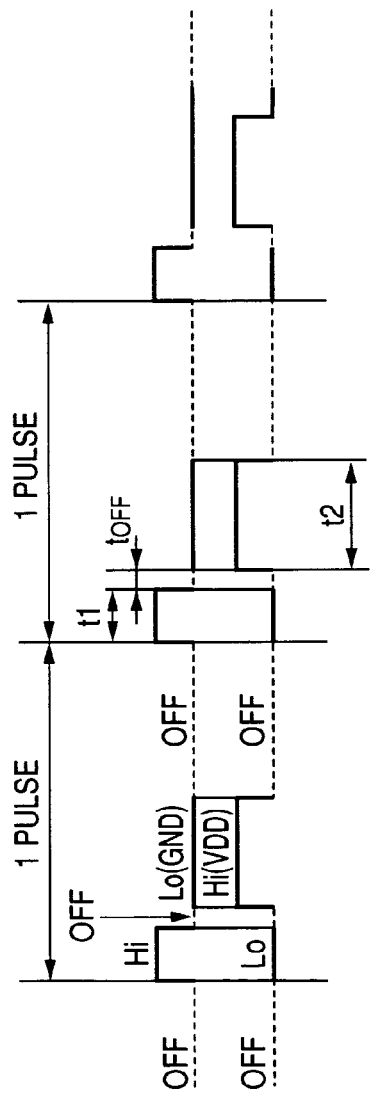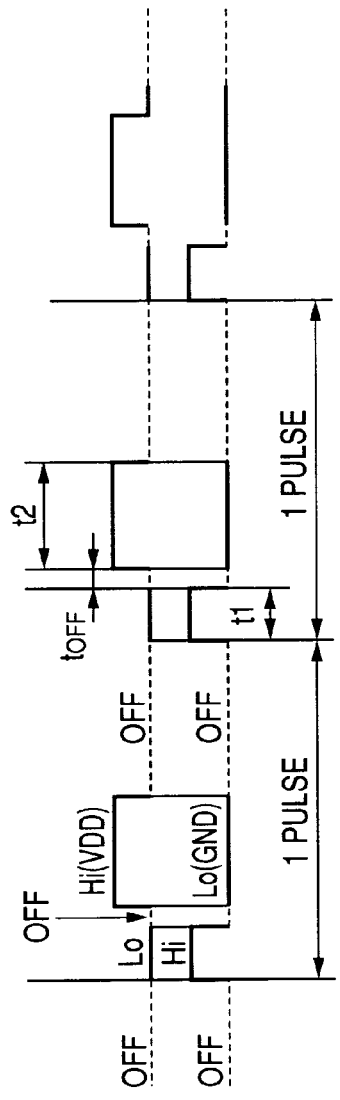

DRIVING MECHANISM, IMAGING MECHANISM AND CELLULAR PHONE

BACKGROUND OF THE INVENTION

1. Filed of the Invention

The present invention relates to a driving mechanism, an imaging mechanism and a cellular phone provided with the driving mechanism, and, in particular, to a driving mechanism for driving a zoom lens and a focus lens of a camera, an imaging mechanism and a cellular phone provided with the driving mechanism.

2. Description of the Related Art

There is available an actuator in which a piezoelectric element is used as a driving mechanism for a lens part of a digital camera and the like. For example, in the actuator disclosed in Japanese Patent No. 2633066, a driving bar is fastened to the front end surface of a piezoelectric element in the elongating and contracting direction and the rear end surface of the piezoelectric element is fixed to the body of a mechanism. The driving bar is supported in a state that a holding frame of a lens is allowed to slide and the holding frame is urged by a blade spring to make a frictional engagement with the driving bar. An approximately serrate driving pulse is applied to the piezoelectric element, by which the piezoelectric element is deformed in the elongating and contracting direction at a different speed. For example, when the piezoelectric element is deformed slowly, the holding frame moves together with the driving bar. In contrast, when the piezoelectric element is deformed quickly, the holding frame remains at the same position due to inertia of the mass. Therefore, the lens is allowed to move intermittently at a fine pitch on a repeated application of the approximately serrate driving pulse to the piezoelectric element.

However, the related-art actuator has such a problem that in order to prevent the displacement of the rear end surface of a piezoelectric element, the rear end surface must be firmly fixed to the body of a mechanism, which results in a larger size of the mechanism due to the fixture.

Further, there is a method in which, instead of fixing the rear end surface of the piezoelectric element, a weight member is attached to the rear end surface, thereby preventing the rear end surface from being displaced to a greater extent than the front end surface. However, according to the method, a weight member must be provided separately and also rigidly coupled to the piezoelectric element, which is a problem.

SUMMARY OF THE INVENTION

The present invention has been made in view of the above problems, an object thereof is to provide a driving mechanism capable of moving a driven member efficiently by allowing one end thereof to which a driving friction member is attached to be greatly displaced on elongation and contraction of an electro-mechanical conversion element and also excellent in productivity as well as to provide an imaging mechanism and a cellular phone in which the driving mechanism is used.

More specifically, the driving mechanism of the present invention is a driving mechanism comprising: (i) an electro-mechanical conversion element comprising: an elongating and contracting portion that elongates and contracts; and a dummy layer that does not contribute to elongation and contraction of the electro-mechanical conversion element, in which one end of the dummy layer is attached to one end, in elongating and contracting direction, of the elongating and contracting portion; (ii) a driving friction member directly or indirectly attached to the other end of the elongating and contracting portion of the electro-mechanical conversion element; and (iii) a driven member frictionally engaged with the driving friction member, wherein a center of gravity of the entire electro-mechanical conversion element is not made coincident with a geometric center of the elongating and contracting portion in the elongating and contracting direction.

According to the present invention, the center of gravity of the entire electro-mechanical conversion element is not made coincident with the geometric center of the elongating and contracting portion in the elongating and contracting direction, by which one end side thereof is allowed to be greatly displaced on elongation and contraction of the electro-mechanical conversion element to move the driven member efficiently.

Further, in the driving mechanism of the present invention, it is preferable that the center of gravity of the entire electro-mechanical conversion element is positioned at the dummy layer side further away from the geometric center of the elongating and contracting portion in the elongating and contracting direction.

According to the present invention, the center of gravity of the electro-mechanical conversion element is positioned at the dummy layer side further away from the geometric center of the elongating and contracting portion in the elongating and contracting direction, by which one end side thereof is allowed to be displaced to a greater extent than the other end side on elongation and contraction of the electro-mechanical conversion element to move the driven member efficiently.

Further, the driving mechanism of the present invention is a driving mechanism comprising: (i) an electro-mechanical conversion element comprising: an elongating and contracting portion that elongates and contracts; and a dummy layer that does not contribute to elongation and contraction of the electro-mechanical conversion element, in which one end of the dummy layer is attached to one end, in elongating and contracting direction, of the elongating and contracting portion; (ii) a driving friction member directly or indirectly attached to the other end of the elongating and contracting portion of the electro-mechanical conversion element; and (iii) a driven member frictionally engaged with the driving friction member, wherein the relationship of $M1 \leq M \leq (M1 + \mu M2)$ is satisfied when weight of the dummy layer is designated as M; weight of the driving friction member is designated as M1; bonding force of the driven member with the driving friction member is designated as M2; friction coefficient between the driven member and the driving friction member is designated as $\mu$.

In addition, the driving mechanism of the present invention is a driving mechanism comprising: (i) an electro-mechanical conversion element comprising: an elongating and contracting portion that elongates and contracts; and a dummy layer that does not contribute to elongation and contraction of the electro-mechanical conversion element, in which one end of the dummy layer is attached to one end, in elongating and contracting direction, of the elongating and contracting portion; (ii) a driving friction member directly or indirectly attached to the other end of the elongating and contracting portion of the electro-mechanical conversion element; and (iii) a driven member frictionally engaged with the driving friction member, wherein the relationship of $L/8 \leq L1 \leq L/2$ is satisfied when length of the dummy layer in the elongating and contracting direction is designated as L1; length of the electro-mechanical conversion element in the elongating and contracting direction is designated as L.

According to the above-described inventions, a dummy layer which satisfies the relationship is provided, by which the dummy layer functions as a weight member for suppressing the displacement of the rear end surface of an electro-mechanical conversion element, making it possible to prevent the rear end surface of the electro-mechanical conversion element from being displaced to a greater extent than the front end surface. Therefore, a driven member is allowed to move accurately via a driving friction member attached to the front end surface of the electro-mechanical conversion element. Further, the dummy layer formed integrally with the rear end of the electro-mechanical conversion element is utilized as a weight member, thereby removing the necessity for providing separately the weight member for coupling and making it possible to simply constitute a mechanism.

Further, in the driving mechanism of the present invention, it is preferable that the electric conversion element is supported laterally to a cabinet in the elongating and contracting direction. In this instance, it is preferable that the other end of the dummy layer of the electro-mechanical conversion element is not supported by the cabinet but kept free.

According to the present invention, vibration derived from the elongation and contraction of an electro-mechanical conversion element is hardly transmitted to a cabinet side, thereby making it possible to prevent resonance resulting from the elongation and contraction.

Further, in the driving mechanism of the present invention, it is preferable that the other end of the dummy layer of the electro-mechanical conversion element is supported to a cabinet.

Further, in the driving mechanism of the present invention, it is preferable that the electro-mechanical conversion element is elastically supported to the cabinet.

Still further, the imaging mechanism of the present invention comprises the driving mechanism described in any one of the above descriptions; and an optical member coupled to the driven member of the driving mechanism, and moved by the driving mechanism.

In addition, the cellular phone of the present invention comprises the driving mechanism described in any one of the above descriptions or the above-described imaging mechanism.

BRIEF DESCRIPTION OF THE DRAWINGS

FIGS. 11A and 11B are wave pattern views of an input signal to be inputted into the driving circuit in FIG. 10; and FIGS. 12A and 12B are wave pattern views of an output signal to be outputted from the driving circuit in FIG. 10.

DETAILED DESCRIPTION OF THE INVENTION

Hereinafter, a detailed explanation will be made for preferred embodiments of the driving mechanism, the imaging mechanism and the cellular phone of the present invention with reference to the attached drawings.

First Embodiment

Figure 1:
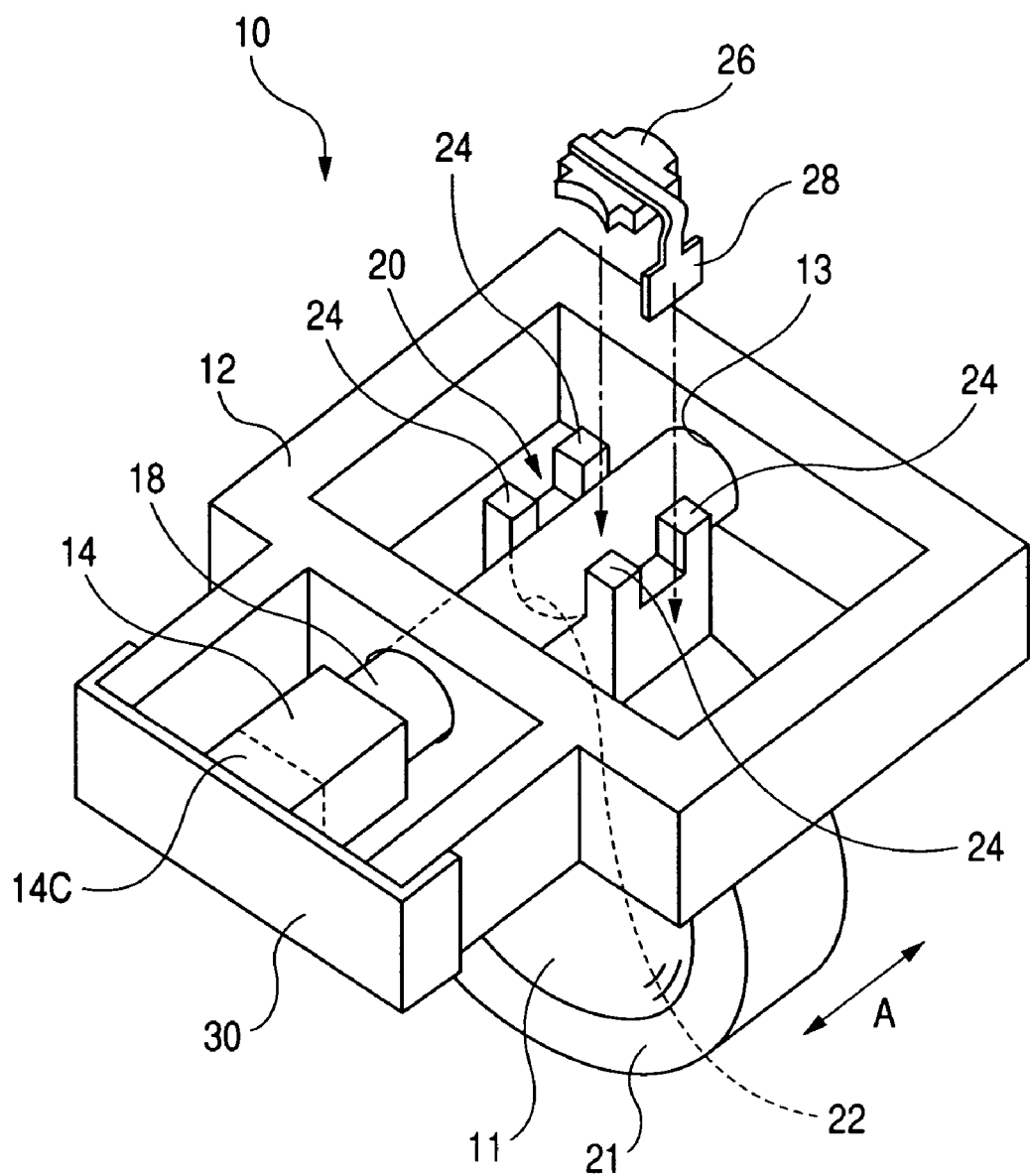
FIG. 1 is a perspective view showing a driving mechanism of a first embodiment in the present invention.
Figure 2:
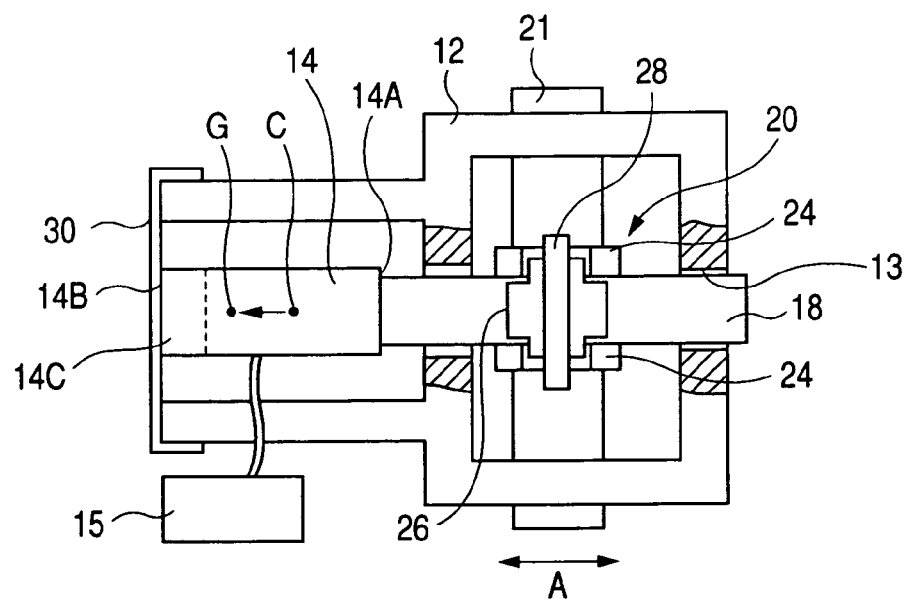
FIG. 2 is a plan view schematically showing the constitution of the driving mechanism given in FIG. 1.

FIG. 1 is a perspective view showing a driving mechanism of a first embodiment of the present invention, and FIG. 2 is a plan view showing graphically the constitution.

The driving mechanism 10 shown in the above drawings is mounted on a small precision instrument such as a cellular phone and used as a driving mechanism for moving a zoom lens 11 such as a zoom lens and a focus lens in the direction as shown by the arrow A.

The driving mechanism 10 is attached to a body 12 of a small precision instrument, and constituted mainly by a piezoelectric element 14, a driving bar (corresponding to a driving friction member) 18, a driven member 20 and a driving pulse supplying device 15.

A piezoelectric element 14 is formed in a long rectangular shape in the direction as shown by the arrow A, and constituted so as to be deformed (elongation and contraction) in the longitudinal direction on application of voltage. Therefore, the piezoelectric element 14 is displaced at the end surfaces in the longitudinal direction (hereinafter referred to as displaced surfaces) 14A and 14B on application of voltage.

Of the displaced surfaces 14A and 14B of the piezoelectric element 14, to one end of the displaced surface (hereinafter referred to as the displaced surface at the front end) 14A is fastened the base end of a driving bar 18. The driving bar 18 is formed in a cylindrical shape, the leading end thereof is inserted through a hole 13 formed in a body 12 and supported so as to slide in an axial direction. The driving bar 18 is made with a graphite crystal composite in which graphite crystals are rigidly compounded, for example, carbon graphite.

A driven member 20 is attached to a driving bar 18 in the direction as shown by the arrow A in a state that it is allowed to slide. The driven member 20 is formed integrally with a holding frame 21 of a zoom lens 11. The holding frame 21 is guided by a guide bar (not shown) arranged in parallel with the driving bar 18 to prevent rotation around the driving bar 18.

Further, a U-shaped groove 22 is formed in a driven member 20 and a driving bar 18 is engaged with the groove 22. Projections 24 and 24 . . . projecting upward are provided at each of the four corners of the driven member 20, and a friction plate 26 is provided at an area surrounded by the projections 24 and 24 . . . . The friction plate 26 is bent and formed in a circular shape in accordance with the side surface configuration of the driving bar 18. Further, each corner of the friction plate 26 is notched in accordance with the projections 24 and 24 . . . of the driven member 20. Therefore, the friction plate 26 is arranged in an area surrounded by the projections 24 and 24 . . . to prevent removal of the friction plate 26.

A presser spring 28 is attached to a driven member 20. The presser spring 28 is constituted so as to urge a friction plate 26 to the driven member 20 side. Therefore, when a driving bar 18 is arranged on the U-shaped groove 22 of the driven member 20 and the friction plate 26 is placed thereon, the friction plate 26 is pressed to the driving bar 18 by a presser spring 28, and the driving bar 18 is held between the friction plate 26 and the driven member 20, thereby allowing the driven member 20 to be frictionally engaged with the driving bar 18.

Friction force between the friction plate 26 and the driving bar 18 is provided in a state that, on application of a driving pulse having gradually changing voltage to a piezoelectric element 14, the static friction force is greater than the driving force and, on application of a driving pulse having abruptly changing voltage to the piezoelectric element 14, the static friction is smaller than the driving force. It is noted that in place of a presser spring 28, other urging means, for example, an elastic body such as a contraction spring and rubber, may be used, thereby allowing the friction plate 26 to be frictionally engaged with the driving bar 18.

A fitting 30 is attached to the displaced surface 14B at the rear end of a piezoelectric element 14, and the piezoelectric element 14 is supported to a body 12 via the fitting 30. The fitting 30 is formed into a U shape by bending a thin metal plate, and the bent portions on both ends are fitted and fixed to the body 12. Since the fitting 30 made with the thin metal plate is used to support the piezoelectric element 14, the fitting 30 is bent flexibly, by which the displaced surface 14B at the rear end of the piezoelectric element 14 is supported so as to be displaced in the direction as shown by the arrow A.

A dummy layer 14C is provided at the rear end of a piezoelectric element 14. The dummy layer 14C is a non-elongating or contracting portion which does not contribute to elongation and contraction of the piezoelectric element 14. More specifically, an elongating and contracting portion (active layer) in the piezoelectric element 14 acts to elongate and contract, whereas the dummy layer 14C does not contribute to the action of elongation or contraction.

Further, since a dummy layer 14C is provided, the center of gravity G of a piezoelectric element 14 is not made coincident with the geometric center C of an elongating and contracting portion in the elongating and contracting direction. For example, the center of gravity G of the piezoelectric element 14 is positioned at the rear end side further away from the geometric center C of the elongating and contracting portion in the elongating and contracting direction. In other words, the dummy layer 14C is provided at the rear end of the piezoelectric element 14, by which the center of gravity of the piezoelectric element 14 is positioned at the rear end side away from the center of the elongating and contracting portion.

The dummy layer 14C includes, for example, uses of ceramics of the same material with the piezoelectric element. Further, the dummy layer 14C contained in the piezoelectric element 14 is a dummy layer 14C which satisfies the relationship of $M1 \leq M \leq (M1+\mu M2)$ obtained when the weight of the dummy layer 14C is designated as M; the weight of the driving bar 18, M1; the bonding force of the driven member 20 with the driving bar 18, M2; the friction coefficient between the driven member 20 and the driving bar 18, $\mu$.

A piezoelectric element 14 is electrically connected to a driving pulse supplying device 15, and voltage is applied from the driving pulse supplying device 15 to the piezoelectric element 14.

Figure 3A:
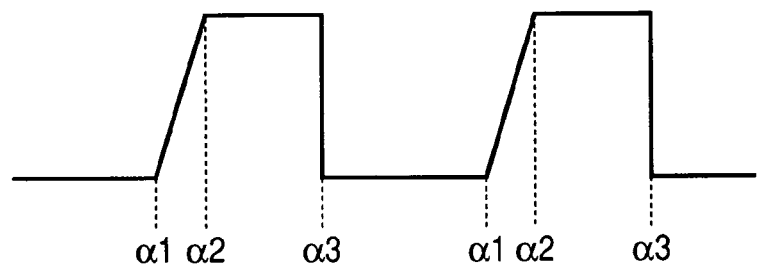
FIGS. 3A and 3B are wave pattern views of a driving pulse which is applied to a piezoelectric element of the driving mechanism in FIG. 1.
Figure 3B:
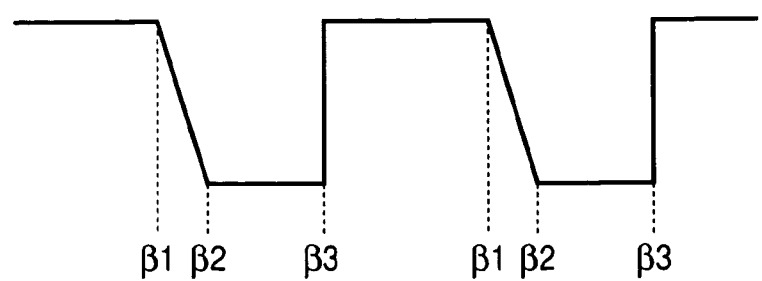

FIG. 3A and FIG. 3B show one example of a driving pulse applied to a piezoelectric element 14. FIG. 3A shows a driving pulse found when the holding frame 21 of FIG. 1 is moved to the right as shown by the arrow A, and FIG. 3B shows a driving pulse found when the holding frame 21 of FIG. 1 is moved to the left as shown by the arrow A. The driving pulse given in FIG. 3A or that in FIG. 3B is a pulse signal, the wave pattern of which rises and falls in an asymmetrical manner. In the driving pulse given in FIG. 3A, the wave pattern rises more gradually than when it falls, whereas in the driving pulse in FIG. 3B the wave pattern falls more gradually than when it rises.

As shown in FIG. 3A, an approximately serrate driving pulse which rises gradually from a time $\alpha 1$ to a time $\alpha 2$ and falls abruptly at a time $\alpha 3$ is applied to a piezoelectric element 14. Therefore, from the time $\alpha 1$ to the time $\alpha 2$, the piezoelectric element 14 is gradually elongated. In this instance, since a driving bar 18 moves slowly, a driven member 20 moves together with the driving bar 18. Thereby, the driven member 20 is allowed to move to the right as shown in FIG. 1. Since the piezoelectric element 14 is abruptly contracted at the time $\alpha 3$, the driving member 18 moves to the left as shown in FIG. 1. In this instance, an abrupt movement of the driving bar 18 allows the driving member 18 alone to move, while the driven member 20 is kept halted at the position concerned due to inertia. Since the driven member 20 given in FIG. 1 repeats the movement and the halt to the right by a repeated application of the serrate driving pulse shown in FIG. 3A, a holding frame 21 is allowed to move to the right.

As shown in FIG. 3B, an approximately serrate driving pulse which falls gradually from a time $\beta 1$ to a time $\beta 2$ and rises abruptly at a time $\beta 3$ is applied to a piezoelectric element 14. Therefore, at the time $\beta 1$ to the time $\beta 2$ the piezoelectric element 14 is gradually contracted. In this instance, a gradual displacement of a driving bar 18 allows a driving member 20 to move together with the driving bar 18. Thereby, the driven member 20 is allowed to move to the left as shown in FIG. 1. At the time $\alpha 3$, the piezoelectric element 14 elongates abruptly and the driving bar 18 moves to the right as shown in FIG. 1. In this instance, an abrupt movement of the driving bar 18 allows the driving bar 18 alone to move, while the driven member 20 is kept halted at the position concerned due to inertia. Since the driven member 20 given in FIG. 1 repeats the movement and the halt to the left by a repeated application of the serrate driving pulse shown in FIG. 3B, a holding frame 21 is allowed to move to a transverse direction (in a direction from left to right)

Figure 4A:
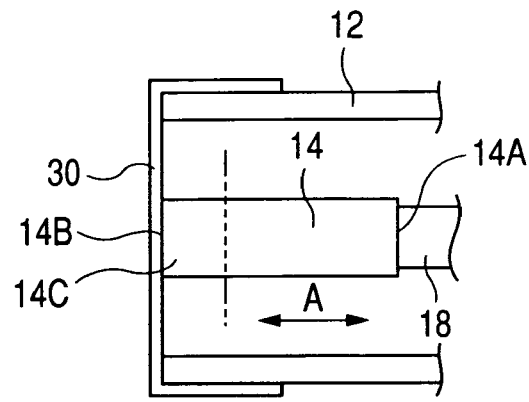
FIGS. 4A to 4C are views explaining the operation of the driving mechanism in FIG. 1.
Figure 4B:
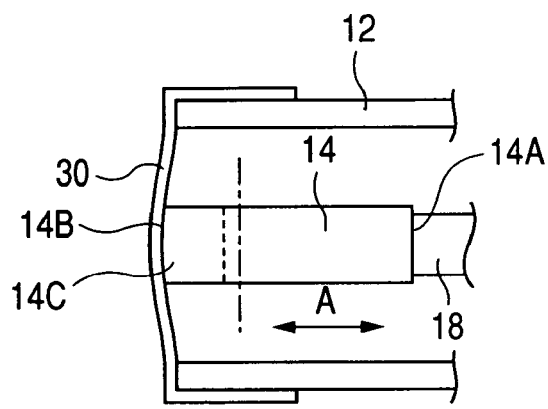
Figure 4C:
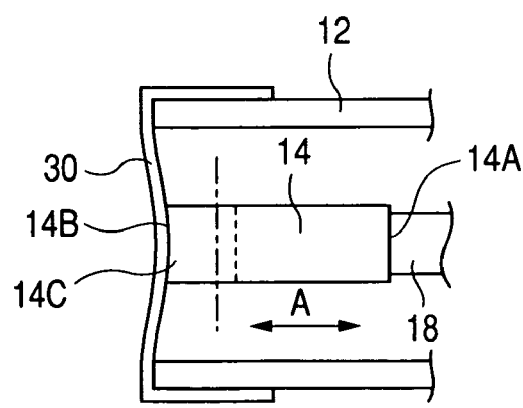

In the thus constituted driving mechanism 10, the displaced surface 14B at the rear end of a piezoelectric element 14 is attached to a body 12 via a thin metal-plate fitting 30. Therefore, the displaced surface 14B at the rear end of the piezoelectric element 14 is, as shown in FIG. 4A through FIG. 4C, supported so as to be displaced. In other words, when voltage is applied to the piezoelectric element 14 for elongation, with no voltage applied to the piezoelectric element 14, as shown in FIG. 4A, the fitting 30 is deformed elastically and bent flexibly outward, as shown in FIG. 4B. Then, the displaced surface 14B of the piezoelectric element 14 is displaced to the left as shown by the arrow A. In contrast, when the piezoelectric element 14 is contracted, the fitting 30 is deformed elastically and bent flexibly inward, as shown in FIG. 4C, and the displaced surface 14B of the piezoelectric element 14 is displaced to the right as shown by the arrow A. Therefore, the displaced surface 14B at the rear end of the piezoelectric element 14 is supported in the direction as shown by the arrow A so as to be displaced.

As described above, since the displaced surface 14B at the rear end of the piezoelectric element 14 is supported in a state that it is kept substantially free and allowed to be displaced, it is possible to reduce the resonance frequency $f_0$ of a component system. For example, the resonance frequency f which is about 200 kHz when the displaced surface 14B is supported as a fixed end can be decreased to a range from 20 to 30 kHz. The driving frequency f of 50 kHz or greater, which is an ordinary frequency, is used in a vibration-isolating range which satisfies the relationship of $f \geq 2^{1/2} \cdot f_0$, thereby, making it possible to prevent the resonance of the piezoelectric element 14 itself. Then, since a stable driving capacity is constantly secured and a driving mechanism 10 is allowed to be driven in a wider frequency range, it is possible to prevent adverse effects such as environmental factors or variation in products.

It is noted that where a weight member is attached to the end of a piezoelectric element 14 which is kept free, the resonance frequency $f_0$ is expressed by the formula below, in which E denotes Young's modulus of the weight member; A, area on the piezoelectric element 14 side of the weight member; h, thickness of the weight member; Ma, mass of the piezoelectric element 14; Mb, mass of the driving bar 18; Mc, mass of the weight member.

$$f_0 = \frac{1}{2\pi}\sqrt{\frac{EA}{\left(Ma+Mb+\frac{1}{3}Mc\right)h}} \qquad \text{[Formula 1]}$$

Meanwhile, as described above, a dummy layer 14C at the rear end of a piezoelectric element 14 is formed so as to satisfy the relationship of M1≦M≦(M1+μM2). In the dummy layer 14C which satisfies the above relationship, since the weight M of the dummy layer 14C at the rear end of the piezoelectric element 14 is greater than the weight M1 of a driving bar 18 attached to the displaced surface 14A at the front end of the piezoelectric element 14, the displaced surface 14B at the rear end is displaced to a smaller extent than the displaced surface 14A at the front end. Therefore, the dummy layer 14C, which functions as a weight member, is able to displace efficiently the displaced surface 14A at the front end and the driving bar 18 on elongation and contraction of the piezoelectric element 14.

Further, since the load (M1+μM2) exerted on the displaced surface 14A at the front end of the piezoelectric element 14 is greater than the weight M of the dummy layer 14C, the rear end of the piezoelectric element 14 is supported in a state that it is substantially free and allowed to be displaced. It is, thereby, possible to prevent the resonance of a component system. More specifically, where the weight M of the dummy layer 14C is greater than the load (M1+μM2) exerted on the displaced surface 14A, the rear end of the piezoelectric element 14 is so heavy that it acts like a fixed end. The component system is increased in resonance frequency $f_0$, and the driving frequency f is lower than $f_0$ to result in a frequent resonance of the component system. Therefore, in the present embodiment where the relationship of M≦(M1+μM2) is provided, the rear end of the piezoelectric element 14 acts to be substantially kept free, thereby making it possible to prevent the resonance of the component system.

Thus, according to the present embodiment, since a dummy layer 14C having weight to satisfy the above-described relationship is provided at the rear end of a piezoelectric element 14, an effect can be obtained which is similar to a case where a weight member is provided on the displaced surface 14B at the rear end of the piezoelectric element 14. Therefore, it is possible to displace accurately a driving bar 18 and also to prevent the resonance of the component system.

In the above-described embodiment, a dummy layer 14C is constituted by the same material as a piezoelectric element 14. However, the dummy layer 14C is not limited in material thereto but may be constituted by a material which is smaller in Young's modulus than the piezoelectric element 14. The dummy layer 14C is constituted by a material small in Young's modulus, thereby making it possible to reduce the resonance frequency $f_0$ of a component system and use the driving frequency f in a wider range.

In the present embodiment, an explanation was made for a case where a piezoelectric element 14 is attached to a body 12 in an axial direction via a fitting 30. However, the piezoelectric element 14 may be attached to the body 12 laterally. For example, as shown in a third embodiment to be explained later, the piezoelectric element 14 is attached laterally to an elastic member. In this instance, the piezoelectric element 14 and a driving bar 18 are attached and supported so that they can move in the elongating and contracting direction of the piezoelectric element 14.

Further, in the present embodiment, FIG. 1 and FIG. 2 show only a dummy layer 14C at the rear end side of a piezoelectric element 14, but the dummy layer may be provided at the front end side of the piezoelectric element 14.

Still further, in the present embodiment, an explanation was made for a driving mechanism in which a piezoelectric element 14 was used. However, it is preferable to use the driving mechanism mounted on an imaging mechanism. For example, the driving mechanism is used to move and control a lens of a photographic optical system, thereby making it possible to provide an imaging mechanism which is small in size and excellent in focus adjusting operation.

In addition, it is preferable to use the imaging mechanism in a camera portion of a cellular phone. In this instance, a small-sized cellular phone provided with an imaging function is provided.

Second Embodiment

Figure 5:
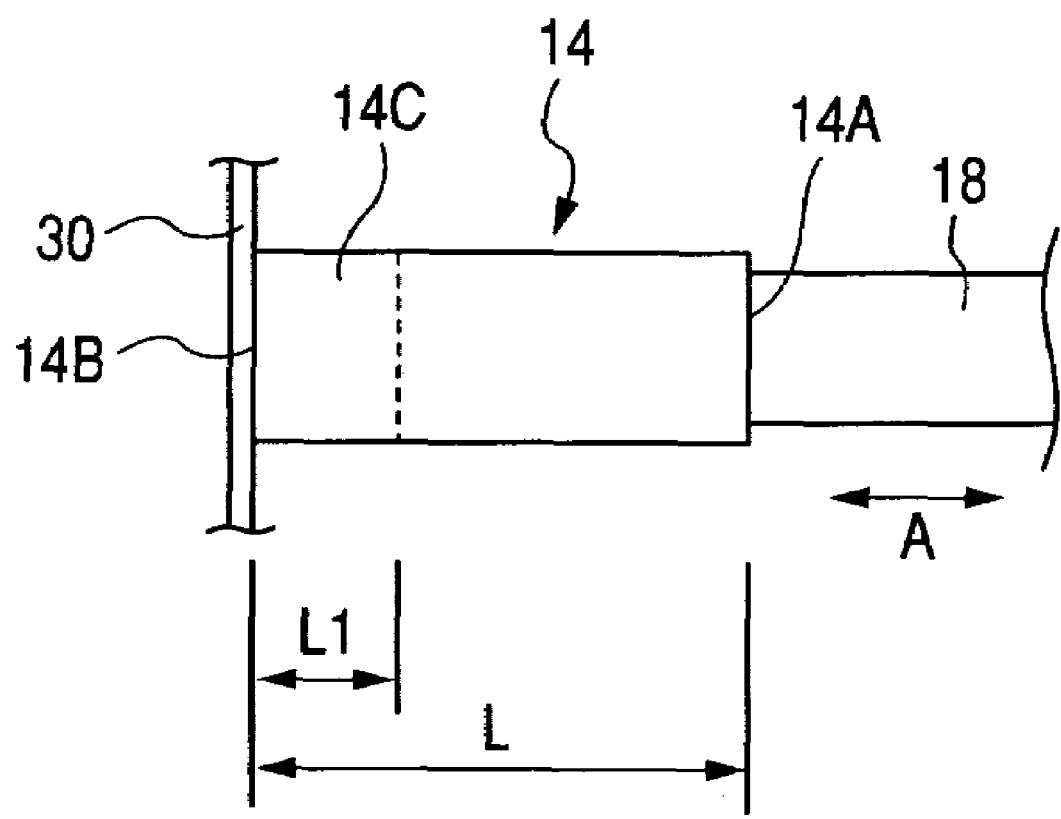
FIG. 5 is a plan view explaining a driving mechanism of a second embodiment in the present invention.

Next, an explanation will be made for a second embodiment of a driving mechanism, an imaging mechanism and a cellular phone in the present invention with reference to FIG. 5. In the above-described first embodiment, the dummy layer 14C is specified by weight. However, in the second embodiment, the dummy layer 14C is specified by the length in the elongating and contracting direction.

In the driving mechanism of the second embodiment, a dummy layer 14C is formed integrally with the same material as a piezoelectric element 14. The dummy layer 14C is formed so as to satisfy the relationship of L/8≦L1≦L/2 when the length of the piezoelectric element 14 in the elongating and contracting direction is designated as L and the length of the dummy layer 14C, L1.

According to the thus constituted second embodiment, since the relationship of L/8≦L1 is provided, a dummy layer 14C has a sufficient weight and functions as a weight member. Further, since the relationship of L1≦L/2 is provided, it is possible to prevent a useless enlargement of the piezoelectric element 14 due to an excessively large dimension of a dummy layer 14C. Further, in order to give an increased function to the dummy layer 14C as a weight member, the length of the dummy layer 14C may be provided so as to satisfy the relationship of L/6≦L1≦L/2. It is more preferable that the length of the dummy layer 14C may be provided so as to satisfy the relationship of L/4≦L1≦L/2.

It is preferable to form a dummy layer 14C which is able to satisfy at the same time the conditions, namely, the length of the dummy layer 14C shown in the second embodiment and the weight of the dummy layer 14C shown in the first embodiment. Thereby, the dummy layer 14C, which functions as a weight member, is able to move a driven member 20 accurately and also prevent a piezoelectric element 14 from being excessively enlarged.

Further, the driving mechanism of the present embodiment may be applicable to small precision instruments such as a digital camera and a cellular phone. In particular, when the driving mechanism of the present embodiment is used in a cellular phone which must be driven at a low voltage of 3V or lower, the cellular phone is allowed to be driven at a high frequency of about 20 kHz, thereby making it possible to move a lens frame 20 at a high speed of 2 mm/s or greater. Thereby, even a zoom lens which must be moved at a distance of about 10 mm is allowed to move quickly. Further, the driving mechanism of the present embodiment is not limited to an application in which zoom lenses 11 such as a focus lens and a zoom lens are moved but may be used in an application in which a CCD is moved.

Third Embodiment

Next, an explanation will be made for a driving mechanism, an imaging mechanism and a cellular phone of a third embodiment in the present invention.

Figure 6:
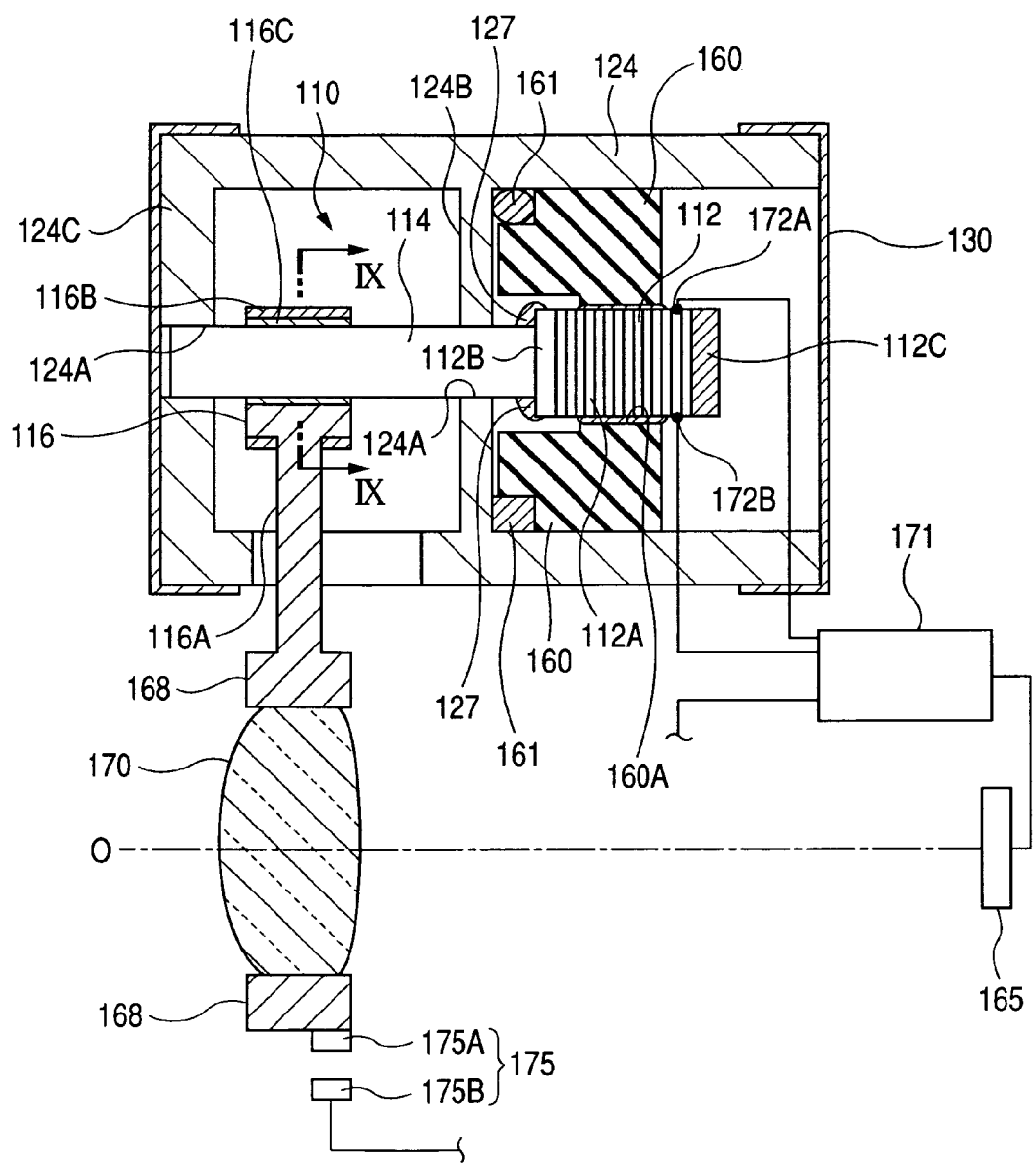
FIG. 6 is a brief constitutional view showing a driving mechanism of a third embodiment in the present invention.

FIG. 6 is a sectional view showing the driving mechanism according to the third embodiment of the present invention.

As shown in FIG. 6, the driving mechanism according to the present embodiment is to move a zoom lens 170 and to drive the zoom lens 170. It is provided with an actuator 110 having a piezoelectric element 112, a driving shaft 114 and a driven member 116, and a support member 160 for supporting the actuator 110.

A piezoelectric element 112 is an electro-mechanical conversion element which can be elongated and contracted by inputting an electric signal and also elongated and contracted in a predetermined direction. The piezoelectric element 112 is connected to a controller 171 to undergo elongation and contraction when the electric signal is inputted by the controller 171. The piezoelectric element 112 is provided, for example, with two input terminals 172A and 172B. Voltage applied to the input terminals 172A and 172B is repeatedly increased and decreased, thereby causing the piezoelectric element 112 to elongate and contract repeatedly.

A piezoelectric element 112 is provided with dummy layers 112B and 112C on both sides of an elongating and contracting portion 112A. The elongating and contracting portion 112A is a portion which is elongated and contracted by inputting an electric signal and also called an active layer. A plurality of metal plates are adjacently installed at the elongating and contracting portion 112A, for example, in an axial direction, and ceramics are arranged between these metal plates. The dummy layers 112B and 112C are non-elongating or contracting portions which do not contribute to elongation and contraction. The dummy layer 112B is formed at the end portion to which a driving shaft 114 of the piezoelectric element 112 is attached. The dummy layer 112C is formed at the end side of the piezoelectric element 112 which is kept free.

The center of gravity of a piezoelectric element 112 is not made coincident with the geometric center of an elongating and contracting portion 112A in the elongating and contracting direction. For example, the piezoelectric element 112 is constituted so that the center of gravity thereof is positioned at the rear end side further away from the geometric center of the elongating and contracting portion 112A in the elongating and contracting direction. More specifically, a dummy layer 112C at the rear end side is constituted by a member greater in mass than the dummy layer 112B at the front end side, by which the piezoelectric element 112 can be constituted so that the center of gravity thereof is positioned at the rear end side further away from the geometric center of the elongating and contracting portion 112A. The dummy layer 112C is constituted by a metal member, for example. In this instance, it is preferable that an adhesive agent having insulating properties is used to adhere the dummy layer 112C to the elongating and contracting portion 112A or an insulating layer is provided between the dummy layer 112C and the elongating and contracting portion 112A or an insulating film is coated on a metal member as a dummy layer 112C to provide an insulating treatment.

A driving shaft 114 is attached to a piezoelectric element 112, with a longer side faced to the elongating and contracting direction of the piezoelectric element 112. For example, one end of the driving shaft 114 is in contact with the piezoelectric element 112 and adhered thereto by an adhesive agent 127.

The driving shaft 114 is a driving friction member attached to one end of the piezoelectric element 112 in the elongating and contracting direction and formed in a long rectangular-shaped member, and for example, a cylindrical-shaped member is used. The driving shaft 114 is supported by a partition portion 124B and a partition portion 124C extending inside from a fixed frame 124 so as to move along the longitudinal direction. The partition portion 124B and the partition portion 124C are members for partitioning the movement area of a driven member 116, and also functions as a support member of the driving shaft 114. The fixed frame 124 functions as a cabinet for accommodating an actuator 110.

Through holes 124A through which the driving shaft 114 is inserted are formed, respectively, at the partition portion 124B and the partition portion 124C. The partition portion 124B supports the vicinity of an area for attaching the piezoelectric element 112 of the driving shaft 114, namely, a base end range of the driving shaft 114. The partition portion 124C supports a leading end range of the driving shaft 114. The fixed frame 124 functions as a frame body or a frame member for assembling the actuator 110. The driving shaft 114 is attached to the piezoelectric element 112 to reciprocate along the longitudinal direction in accordance with the repeated movement of elongation and contraction of the piezoelectric element 112.

Further, FIG. 6 shows a case where the driving shaft 114 is supported at two areas, namely on the leading end side and the base end side by the partition portions 124B and 124C. There is also a case where the driving shaft 114 is supported either only on the leading end side or on the base end side. For example, a through hole 124A of the partition portion 124B is formed larger than an outer diameter of the driving shaft 114, by which the driving shaft 114 is supported by the partition portion 124C only at the leading end range. Further, the through hole 124A of the partition portion 124C is formed larger than an outer diameter of the driving shaft 114, by which the driving shaft 114 is supported by the partition portion 124B only at the base end area.

In addition, FIG. 6 shows a case where the partition portions 124B and 124C supporting the driving shaft 114 are integrally formed with a fixed frame 124. These partition portions 124B and 124C may be provided by attaching to a member separated from the fixed frame 124. Even in the case of the separated member, functions and effects similar to the case of the integrated member can be obtained.

A driven member 116 is movably attached to a driving shaft 114. The driven member 116 is attached to the driving shaft 114 through frictional engagement and allowed to move along the longitudinal direction. For example, the driven member 116 is engaged to the driving shaft 114 at a predetermined friction coefficient. The driven member 116 is pressed to the driving shaft 114 at a predetermined pressing force, thereby causing a certain frictional force during movement. Since a movement force exceeding the frictional force is applied to the driven member 116, this allows the driven member 116 to move along the driving shaft 114 against the frictional force.

The actuator 110 is supported by a fixed frame 124 by means of a support member 160. The support member 160 supports laterally the actuator 110 in the elongating and contracting direction of the piezoelectric element 112, and disposed between the fixed frame 124 for accommodating the actuator 110 and the piezoelectric element 112. In this case, it is preferable to support the actuator 110 in a direction orthogonal to the elongating and contracting direction of the piezoelectric element 112. The support member 160 functions as an attachment member for supporting laterally the actuator 110.

The support member 160 is formed by an elastic body having elasticity greater than a predetermined level, such as a silicone resin. The support member 160 is provided with an insertion hole 160A for inserting the piezoelectric element 112 and assembled to the fixed frame 124 in such a state that the piezoelectric element 112 is inserted into the insertion hole 160A. The support member 160 is bonded to the fixed frame 124 via an adhesive agent 161. Further, the support member 160 is bonded to the piezoelectric element 112 via an adhesive agent. The support member 160 is made of an elastic body, thereby making it possible to support the actuator 110 so as to move in the elongating and contracting direction of the piezoelectric element 112. FIG. 6 shows two support members 160, namely, on both sides of the piezoelectric element 112. These two support members 160 and 160 are shown because they are viewed from the cross section of one continuous support member 160.

Further, the support member 160 may be bonded to the fixed frame 124 and to the piezoelectric element 12 by a pressing force of the support member 160 being press-fitted to a space between the fixed frame 124 and the piezoelectric element 112 to press. For example, the support member 160 is constituted by an elastic body and formed to be larger than a space between the fixed frame 124 and the piezoelectric element 112, into which the support member 160 is press-fitted. Thereby, the support member 160 is closely attached to the fixed frame 124 and the piezoelectric element 112. In this case, the piezoelectric element 112 is pressed by the support member 160 from both sides in a direction orthogonal to the elongating and contracting direction, thereby supporting the actuator 110.

In this case, a description was given for a case where the support member 160 is made of a silicone resin. The support member 160 may be constituted by a spring member. For example, a spring member is disposed between the fixed frame 124 and the piezoelectric element 112, thereby supporting the actuator 110 to the fixed frame 124.

A zoom lens 170 is attached via a lens frame 168 to the driven member 116. The zoom lens 170 constitutes a photographic optical system of a camera and is to be moved by a driving mechanism. The zoom lens 170 is integrally coupled to the driven member 116 and provided so as to move together with the driven member 116. A fixed lens (not shown) is disposed on an optical axis O of the zoom lens 170 to constitute the photographic optical system of the camera. Further, an imaging device 165 is placed on the optical axis O. The imaging device 165 is an imaging section for converting an image formed by a photographic optical system to electric signals, and, for example, constituted by a CCD. The imaging device 165 is connected to a controller 171 to output image signals to the controller 171.

A driving mechanism is provided with a detector 175 for detecting the movement position of a driven member 116.

The detector 175 includes, for example, optical detectors such as a photo reflector and photo interrupter. More specifically, where the detector 175 provided with a reflector 175A and a detecting portion 175B is used, the reflector 175A is attached to a lens frame 168 which is integrally formed with the driven member 116 to emit a detection light from the detecting portion 175B to the reflector 175A, and the light reflected on the reflector 175A is detected at the detecting portion 175B, thereby detecting movement positions of the driven member 116 and the zoom lens 170.

The detector 175 is connected to a controller 171. Output signals of the detector 175 are inputted into the controller 171. The controller 171 performs control of the entire driving mechanism, and constituted by, for example, a CPU, a ROM, a RAM, an input signal circuit and an output signal circuit. Further, the controller 171 is provided with a driving circuit for driving the piezoelectric element 112, and outputting electric signals for driving the piezoelectric element 112.

Figure 7:
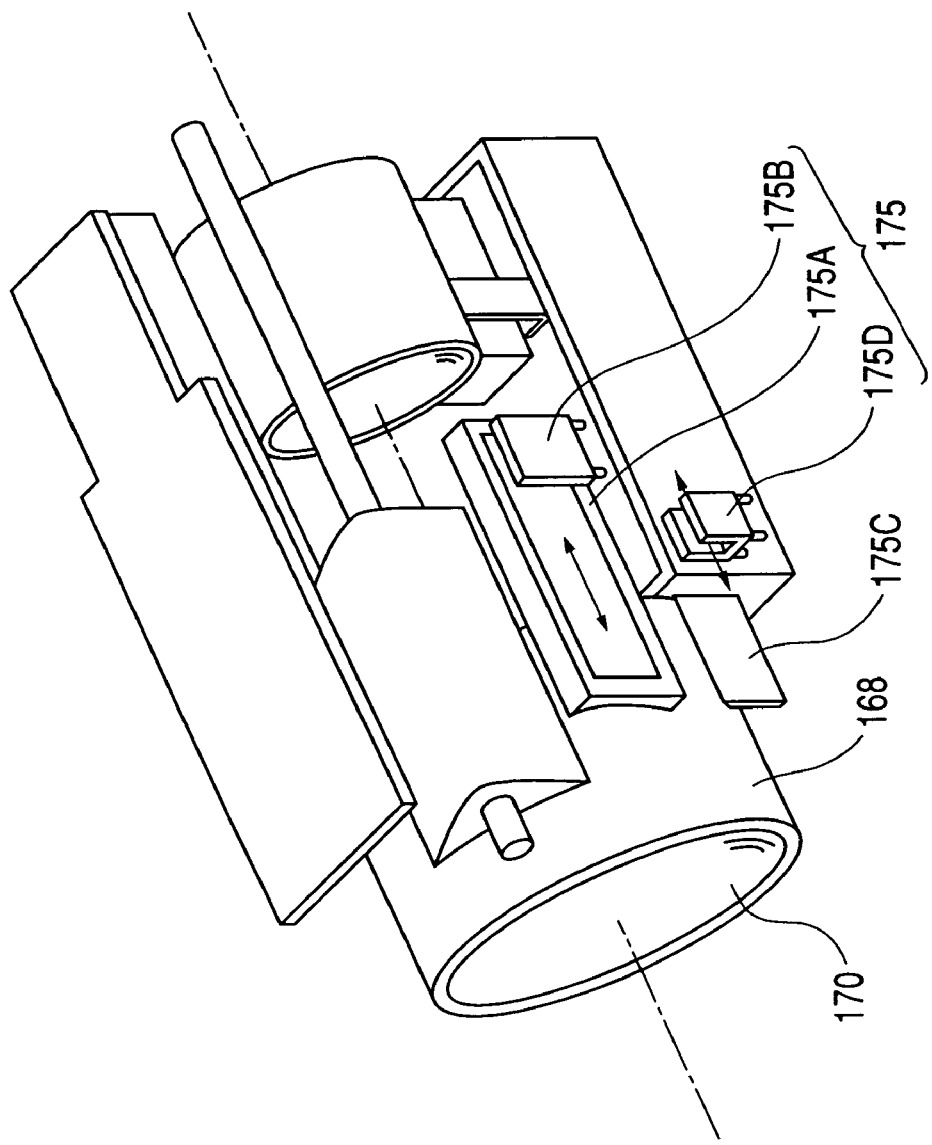
FIG. 7 is a view explaining a detector of the driving mechanism in FIG. 6.
Figure 8:
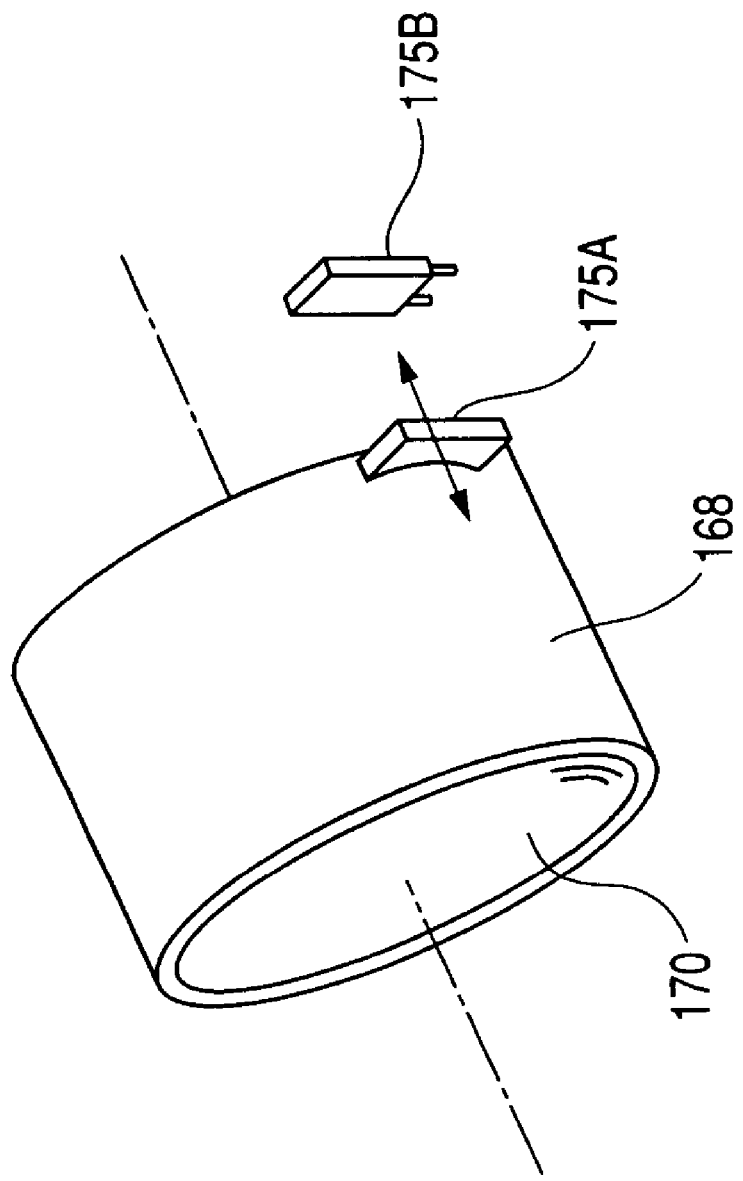
FIG. 8 is a view explaining a detector of the driving mechanism in FIG. 6.

FIG. 7 and FIG. 8 are drawings showing an example of the detector used in the driving mechanism according to the present embodiment.

As shown in FIG. 7, the detector 175 is provided, for example, with a reflector 175A, a detecting portion 175B, an interrupter 175C and a detecting portion 175D. The reflector 175A and the interrupter 175C are attached to a lens frame 168, and move together with the lens frame 168 and a zoom lens 170. At a position opposing the reflector 175A is arranged the detecting portion 175B. The detecting portion 175B detects a reflection quantity of light from the reflector 175A which changes according to the movement of the zoom lens 170, thereby detecting a movement amount of the zoom lens 170. At a position where the interrupter 175C passes is arranged a detecting portion 175D. The detecting portion 175D detects passage of the interrupter 175C and also detects passage of the zoom lens 170 at a predetermined position.

Further, as shown in FIG. 8, the reflector 175A and the detecting portion 175B may be arranged so that the reflector 175A is in access to or spaced apart from the detecting portion 175B in accordance with the movement of the zoom lens 170, and the movement position of the zoom lens 170 is detected in accordance with a relative distance between the detecting portion 175B and the reflector 175A. In this case, the position of the zoom lens 170 can be detected linearly.

In addition, the zoom lens 170 may be moved based on output signals of an imaging device 165 as a method for moving and controlling the zoom lens 170. For example, detection is made for the high frequency content of an image signal output from the imaging device 165, thereby allowing the zoom lens 170 to move at a position where the level is maximized. As described above, the zoom lens 170 is controlled for the movement, thereby removing the necessity for detecting the position by the detector 175.

Figure 9:
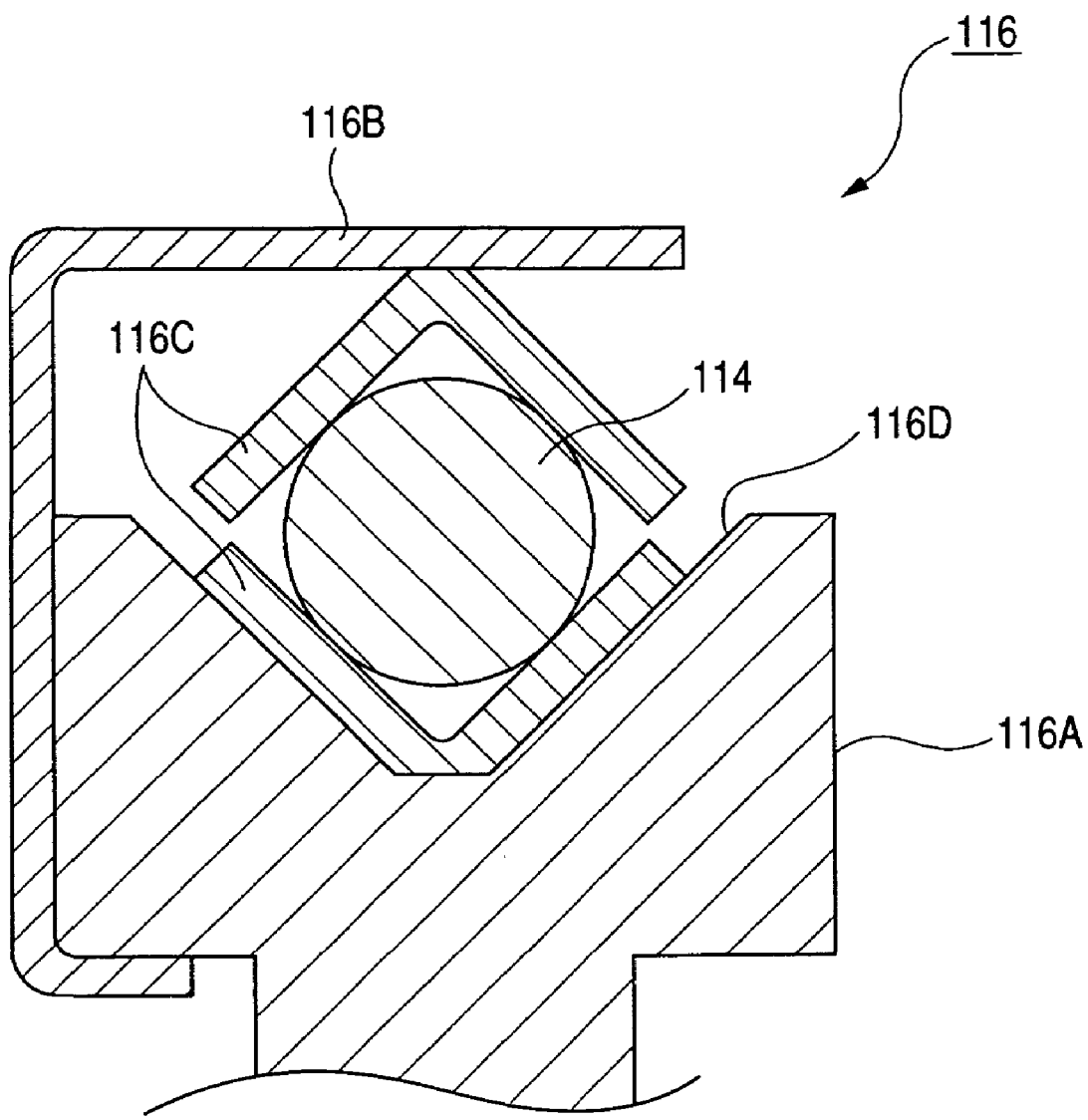
FIG. 9 is a sectional view of a driven member taken along line IX to IX in FIG. 6.

FIG. 9 is a sectional view of the driven member 116 in the line of IX to IX in FIG. 6.

As shown in FIG. 9, the driven member 116 is constituted by, for example, a body 116A, a pressing portion 116B and a sliding portion 116C. The body 116A is pressed to a driving shaft 114 at a certain force by a pressing portion 116B. The body 116A is provided with a V-shaped groove 116D. The driving shaft 114 is accommodated inside the groove 116D so as to be held between two sliding portions 116C and 116C. The sliding portions 116C and 116C are a plate having a V shaped-cross section and arranged so that their recessed portions are opposed to each other. They are provided behind the driving shaft 114. The driving shaft 114 is accommodated inside the V-shaped groove 116D, thereby making it possible to attach the driven member 116 to the driving shaft 114 in a stable manner.

A material, for example, a blade spring having an L-shaped cross section, is used as the pressing portion 116B. One side of the pressing portion 116B is hooked on the body 116A and the other side is placed at a position opposed to the groove 116D, by which the other side is used to hold the driving shaft 114 accommodated in the groove 116D between the body 116A and the sliding portion 116C. Thereby, the body 116A is allowed to be pressed to the driving shaft 114.

As described above, the driven member 116 is attached by pressing the body 116A to the driving shaft 114 at a certain force via the pressing portion 116B, thereby frictionally being engaged with the driving shaft 114. More specifically, the driven member 116 is attached so that the body 116A and the pressing portion 116B are pressed at a certain pressing force to the driving shaft 114 to generate a certain frictional force on movement.

Further, since the driving shaft 114 is held between the sliding portions 116C and 116C having a V-shaped cross section, the driven member 116 comes into a line contact with the driving shaft 114 at plural positions thereby making it possible to frictionally engage with the driving shaft 114 in a stable manner. In addition, since the driven member 116 is in a line contact with plural positions and frictionally engaged with the driving shaft 114, the driven member 116 is practically engaged with the driving shaft 114 in surface contact, thereby providing a stable frictional engagement.

In FIG. 9, the sliding portion 116C is constituted by a plate having a V-shaped cross section. However, the sliding portion 116C may be constituted by a plate having a circular cross section and allowed to be in surface contact with the driving shaft 114. In this case, since the driven member 116 is engaged with the driving shaft 114 in surface contact, the driven member 116 is allowed to be frictionally engaged with the driving shaft 114 more stably.

Figure 10:
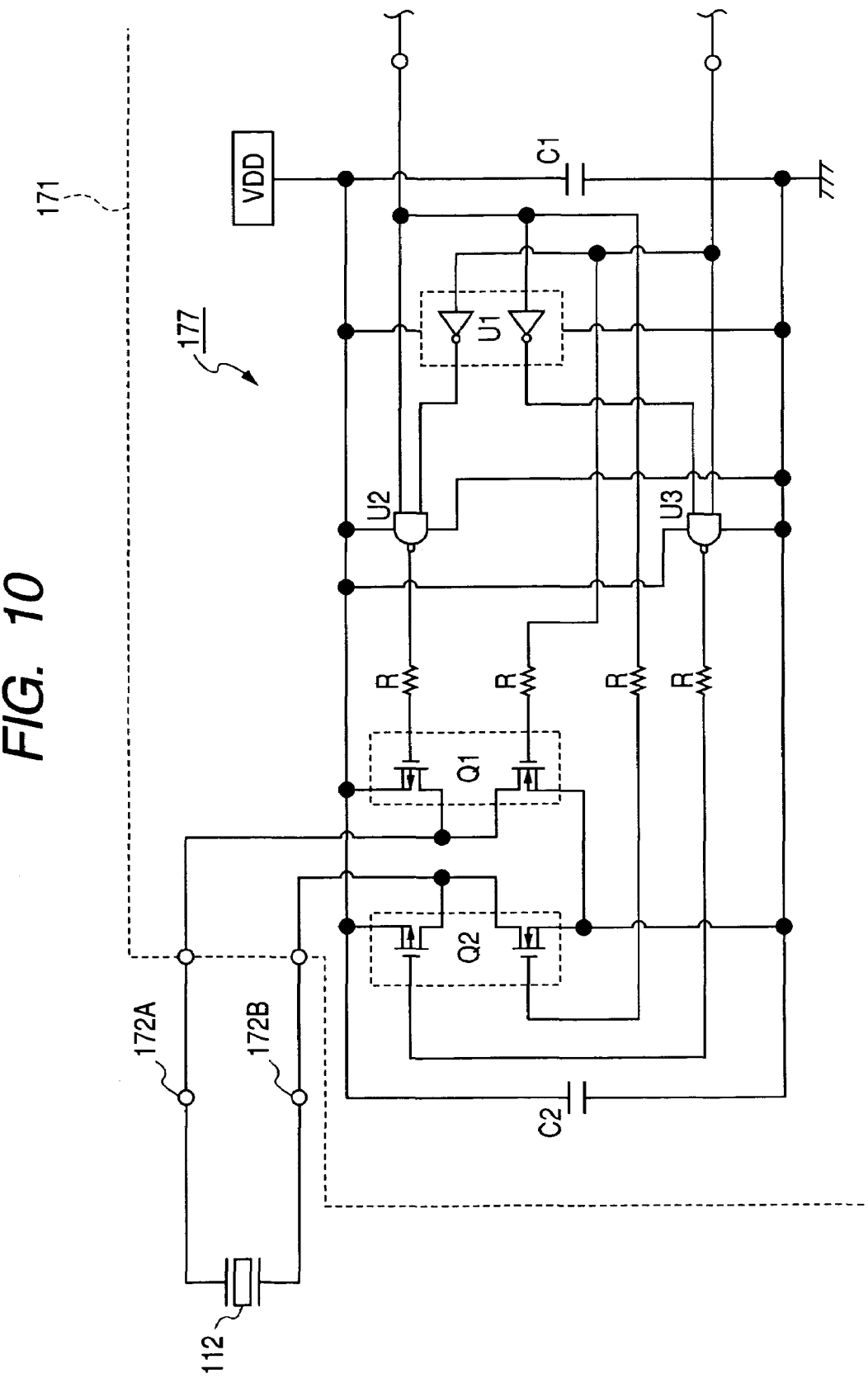
FIG. 10 is a circuit diagram showing a driving circuit of the driving mechanism in FIG. 6.

FIG. 10 is a circuit diagram of the driving circuit which drives the piezoelectric element 112.

As shown in FIG. 10, a driving circuit 177 is provided inside a controller 171. The driving circuit 177 functions as a drive circuit for a piezoelectric element 112 to output a driving electric signal to the piezoelectric element 112. The driving circuit 177 inputs control signals from a control signal generating portion (not shown) of the controller 171 to amplify the voltage or the current of the signal, thereby outputting the driving electric signal for the piezoelectric element 112. In the driving circuit 177, an input section is constituted, for example, by logical circuits U1 to U3, and an output section is provided with field-effect transistors (FET) Q1 and Q2. The transistors Q1 and Q2 are constituted so as to output an H output (high potential output), an L output (low potential output) and an OFF output (open output) as output signals.

FIGS. 11A and 11B show the input signal to be inputted in the driving circuit 177, and FIGS. 12A and 12B show the output signal to be outputted from the driving circuit 177. FIG. 11A shows the input signal to be inputted when the driven member 116 is moved to a direction which is in access to the piezoelectric element 112 (right direction in FIG. 6). FIG. 11B is the output signal to be inputted when the driven member 116 is moved to a direction which is spaced apart from the piezoelectric element 112 (left direction in FIG. 6). Further, FIG. 12A is the output signal to be outputted when the driven member 116 is moved to a direction which is in access to the piezoelectric element 112 (right direction in FIG. 6) and FIG. 12B is the output signal to be outputted when the driven member 116 is moved to a direction which is spaced apart from the piezoelectric element 112 (left direction in FIG. 6).

The output signals in FIGS. 12A and 12B are pulse signals which are turned on and off in synchronization with the input signals in FIGS. 11A and 11B. The two signals in FIGS. 12A and 12B are inputted to input terminals 172A and 172B of the piezoelectric element 112. As shown in FIGS. 3A and 3B, signals having the following trapezoidal wave pattern may be inputted into the input terminals 172A and 172B. However, rectangular pulse signals as shown in FIGS. 12A and 12B may also be inputted to operate the piezoelectric element 112. In this case, the rectangular pulse signals may be used for a driving signal of the piezoelectric element 112, thereby making it possible to generate signals easily.

The output signals in FIGS. 12A and 12B are constituted by two types of rectangular pulse signals to give the same frequency. Since these two pulse signals are mutually different in phase, they are signals in which the mutual difference in potential is made great in a stepwise manner and next made small abruptly or the difference in potential is made abruptly great and next made small in a stepwise manner. When two such signals are inputted, the elongating speed is made different from the contracting speed in the piezoelectric element 112, thereby allowing the driven member 116 to move.

For example, in FIGS. 12A and 12B, it is set that after one of the signals is increased to H (high) and decreased to L (low), the other signal is increased to H. In these signals, it is set that when one of them is decreased to L, the other signal is increased to H, after elapse of a certain time lag $t_{OFF}$. Further, when both of these two signals are decreased to L, the signals are outputted in an off state (open state).

Signals with the frequency exceeding an audible frequency are used for the output signals in FIGS. 12A and 12B, namely, electric signals for operating the piezoelectric element 12. In FIG. 12A and B, these two signals are those having the frequency exceeding an audible frequency, and they are, for example, signals with the frequency preferably 30 to 80 kHz and more preferably 40 to 60 kHz. The signals with the above-described frequency are used to reduce operating sound in an audible region of the piezoelectric element 112.

Next, a description is given for operation of the driving mechanism according to the present embodiment.

In FIG. 6, electric signals are inputted to a piezoelectric element 112, by which the piezoelectric element 112 elongates and contracts repeatedly. A driving shaft 114 reciprocates in accordance with the elongation and contraction. In this case, the piezoelectric element 112 is allowed to elongate or contract at a different speed, thereby allowing the speed of the driving shaft 114 moving in a certain direction to be different from the speed moving in a reverse direction. Therefore, a driven member 116 and a zoom lens 170 are allowed to move in a desired direction.

Since the center of gravity of a piezoelectric element 112 is positioned at the rear end side on elongation and contraction of the piezoelectric element 112, the front end side will be displaced to a greater extent than the rear end side. It is, therefore, possible to move greatly a driving shaft 114 by the elongation and contraction of the piezoelectric element 112 and also to move efficiently a driven member 116 and a zoom lens 170.

Further, on elongation and contraction of the piezoelectric element 112, vibration due to the elongation and contraction occurs. However, since an actuator 110 including the piezoelectric element 112 is supported by means of a support member 160 laterally in the elongating and contracting direction, vibration generated by the elongation and contraction of the piezoelectric element 112 is hardly transmitted outside the actuator 110. Consequently, resonance of the actuator 110 with an external member such as a fixed frame 124 is suppressed to reduce the effect of the resonance. Therefore, the driven member 116 and the zoom lens 170 are allowed to move accurately.

As described above, according to the driving mechanism of the present embodiment, the center of gravity of a piezoelectric element 112 is positioned at the rear end side (on the end side which is kept free) further away from the geometric center of the elongating and contracting portion 112A in the elongating and contracting direction. It is, therefore, possible to displace the front end side to a greater extent than the rear end side on elongation and contraction of the piezoelectric element 112 and also move efficiently a driven member 116.

In the present embodiment, an explanation was made for a case where the center of gravity of a piezoelectric element 112 is positioned at the rear end side further away from the geometric center of an elongating and contracting portion 112A in the elongating and contracting direction. The center of gravity of the piezoelectric element 112 may be, however, positioned at the front end side further away from the geometric center of the elongating and contracting portion 112A in the elongating and contracting direction. Also in this instance, since the center of gravity of the piezoelectric element 112 is not made coincident with the geometric center of the elongating and contracting portion 112A, the rear end side will be greatly displaced by the elongation and contraction of the piezoelectric element 112, and the piezoelectric element 112 reciprocates in its entirety toward the elongating and contracting direction and the piezoelectric element 112 is displaced at the front end side correspondingly. Thereby, a driven member 116 is allowed to move efficiently.

Further, a dummy layer 112C of the piezoelectric element 112 is used to position the center of gravity of the piezoelectric element 112 at the rear end side, by which a driven member 20 can be efficiently moved to the rear end of the piezoelectric element 112 (the end which is kept free) without attaching a weight member. Therefore, preventing unnecessary attachment of the weight member makes it possible to reduce the cost and miniaturize a mechanism.

In addition, according to the driving mechanism of the present embodiment, an actuator 110 is supported laterally to a piezoelectric element 112 in the elongating and contracting direction, by which vibration is hardly transmitted between the actuator 110 and an external member to reduce the effect of the resonance. It is, therefore, possible to move accurately a driven member 116 and a zoom lens 170.

In the above-described present embodiment, an explanation was made for a driving mechanism in which a piezoelectric element 14 was used. It is preferable that the driving mechanism is mounted and used in an imaging mechanism. For example, the driving mechanism is used to move and control a lens of a photographic optical system, thereby making it possible to provide an imaging mechanism which is small in size and excellent in focus adjusting operation.

Further, it is preferable to use the imaging mechanism in a camera portion of a cellular phone. In this instance, provided is a small-sized cellular phone provided with an imaging function.

The above-described individual embodiments show certain examples of the driving mechanism, an imaging mechanism and a cellular phone in the present invention. A driving mechanism, an imaging mechanism and a cellular phone according to the present invention is not limited to a driving mechanism, an imaging mechanism and a cellular phone of the present invention described in these embodiments, but a driving mechanism, an imaging mechanism and a cellular phone of the present invention described in these embodiments may be modified or applied to others as long as they are not deviated from the scope described in each Claim. In the present embodiment, an explanation was made, for example, for the driving mechanism to drive the zoom lens, but may be applied to a driving mechanism to drive an object other than a zoom lens.

According to the driving mechanism, the imaging mechanism and the cellular phone of the present invention, one end side of an electro-mechanical conversion element to which a driving friction member is attached is displaced to a greater extent than the other end side on elongation and contraction of the electro-mechanical conversion element, thereby making it possible to move a driven member efficiently. Further, since it is not necessary to provide separately a weight member on the other end side of the electro-mechanical conversion element, the mechanism can be simply constituted.

The entire disclosure of each and every foreign patent application from which the benefit of foreign priority has been claimed in the present application is incorporated herein by reference, as if fully set forth.

What is claimed is:

1. A driving mechanism comprising:
   an electro-mechanical conversion element comprising:
      an elongating and contracting portion that elongates and contracts; and
      a dummy layer that does not contribute to elongation and contraction of the electro-mechanical conversion element, in which one end of the dummy layer is attached to one end, in elongating and contracting direction, of the elongating and contracting portion, and said dummy layer is supported for movement in the elongating and contracting direction;
   a driving friction member directly or indirectly attached to the other end of the elongating and contracting portion of the electro-mechanical conversion element; and
   a driven member frictionally engaged with the driving friction member,
   wherein a center of gravity of the entire electro-mechanical conversion element is not made coincident with a geometric center of the elongating and contracting portion in the elongating and contracting direction,
   wherein the center of gravity of the entire electro-mechanical element is positioned at the dummy layer side further away from the geometric center of the elongating and contracting portion in the elongating and contracting direction.

2. A driving mechanism comprising:
   an electro-mechanical conversion element comprising:
      an elongating and contracting portion that elongates and contracts; and
      a dummy layer that does not contribute to elongation and contraction of the electro-mechanical conversion element, in which one end of the dummy layer is attached to one end, in elongating and contracting direction, of the elongating and contracting portion;
   a driving friction member directly or indirectly attached to the other end of the elongating and contracting portion of the electro-mechanical conversion element; and
   a driven member frictionally engaged with the driving friction member,
   wherein the relationship of $M1 \leqq M \leqq (M1+\mu M2)$ is satisfied when weight of the dummy layer is designated as M; weight of the driving friction member is designated as M1; bonding force of the driven member with the driving friction member is designated as M2; friction coefficient between the driven member and the driving friction member is designated as μ.

3. A driving mechanism comprising:
an electro-mechanical conversion element comprising:
an elongating and contracting portion that elongates and contracts; and
a dummy layer that does not contribute to elongation and contraction of the electro-mechanical conversion element, in which one end of the dummy layer is attached to one end, in elongating and contracting direction, of the elongating and contracting portion;
a driving friction member directly or indirectly attached to the other end of the elongating and contracting portion of the electro-mechanical conversion element; and
a driven member frictionally engaged with the driving friction member, wherein the relationship of $L/8 \leq L1 \leq L/2$ is satisfied when length of the dummy layer in the elongating and contracting direction is designated as $L1$; length of the electro-mechanical conversion element in the elongating and contracting direction is designated as $L$.

4. The driving mechanism as set forth in claim 1, further comprising a cabinet,
wherein the electro-mechanical conversion element is supported laterally to the cabinet in the elongating and contracting direction.

5. The driving mechanism as set forth in claim 2, further comprising a cabinet,
wherein the electro-mechanical conversion element is supported laterally to the cabinet in the elongating and contracting direction.

6. The driving mechanism as set forth in claim 3, further comprising a cabinet,
wherein the electro-mechanical conversion element is supported laterally to the cabinet in the elongating and contracting direction.

7. The driving mechanism as set forth in claim 4,
wherein the other end of the dummy layer of the electro-mechanical conversion element is not supported by the cabinet but kept free.

8. The driving mechanism as set forth in claim 5,
wherein the other end of the dummy layer of the electro-mechanical conversion element is not supported by the cabinet but kept free.

9. The driving mechanism as set forth in claim 6,
wherein the other end of the dummy layer of the electro-mechanical conversion element is not supported by the cabinet but kept free.

10. The driving mechanism as set forth in claim 1, further comprising a cabinet,
wherein the other end of the dummy layer of the electro-mechanical conversion element is supported to the cabinet.

11. The driving mechanism as set forth in claim 2, further comprising a cabinet,
wherein the other end of the dummy layer of the electro-mechanical conversion element is supported to the cabinet.

12. The driving mechanism as set forth in claim 3, further comprising a cabinet,
wherein the other end of the dummy layer of the electro-mechanical conversion element is supported to the cabinet.

13. The driving mechanism as set forth in claim 1, further comprising a cabinet,
wherein the electro-mechanical conversion element is elastically supported to the cabinet.

14. The driving mechanism as set forth in claim 2, further comprising a cabinet,
wherein the electro-mechanical conversion element is elastically supported to the cabinet.

15. The driving mechanism as set forth in claim 3, further comprising a cabinet,
wherein the electro-mechanical conversion element is elastically supported to the cabinet.

16. An imaging mechanism comprising:
the driving mechanism set forth in claim 1; and
an optical member coupled to the driven member of the driving mechanism, and moved by the driving mechanism.

17. An imaging mechanism comprising:
the driving mechanism set forth in claim 2; and
an optical member coupled to the driven member of the driving mechanism, and moved by the driving mechanism.

18. An imaging mechanism comprising:
the driving mechanism set forth in claim 3; and
an optical member coupled to the driven member of the driving mechanism, and moved by the driving mechanism.

19. A cellular phone comprising the driving mechanism as set forth in claim 1.

20. A cellular phone comprising the driving mechanism as set forth in claim 2.

21. A cellular phone comprising the driving mechanism as set forth in claim 3.

22. A cellular phone comprising the imaging mechanism as set forth in claim 16.

23. A cellular phone comprising the imaging mechanism as set forth in claim 17.

24. A cellular phone comprising the imaging mechanism as set forth in claim 18.

* * * * *